Aug. 28, 1956  E. M. GARNER ET AL  2,760,660
PEANUT STACK CARRIER
Filed April 27, 1954  2 Sheets-Sheet 2
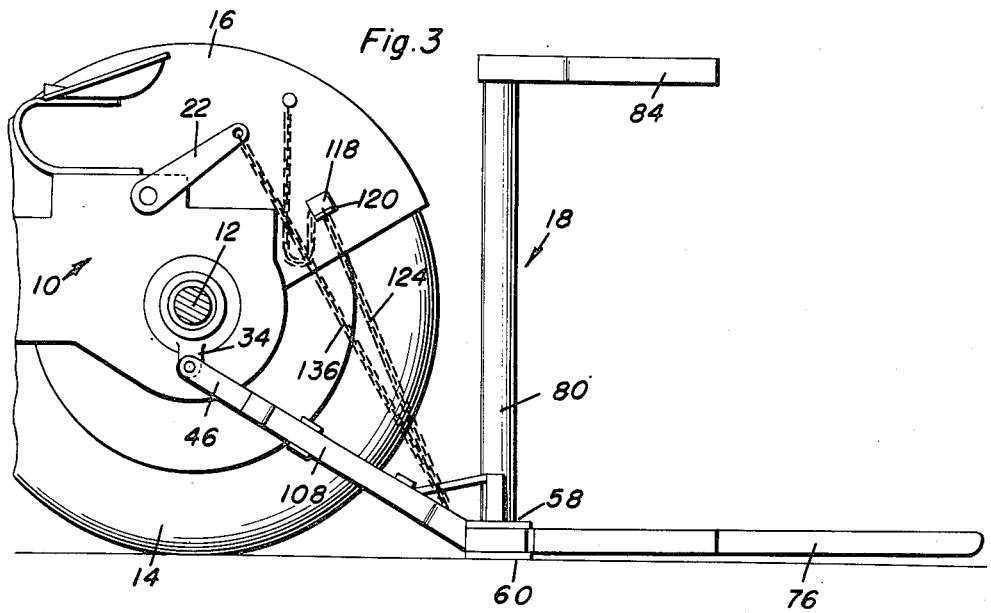
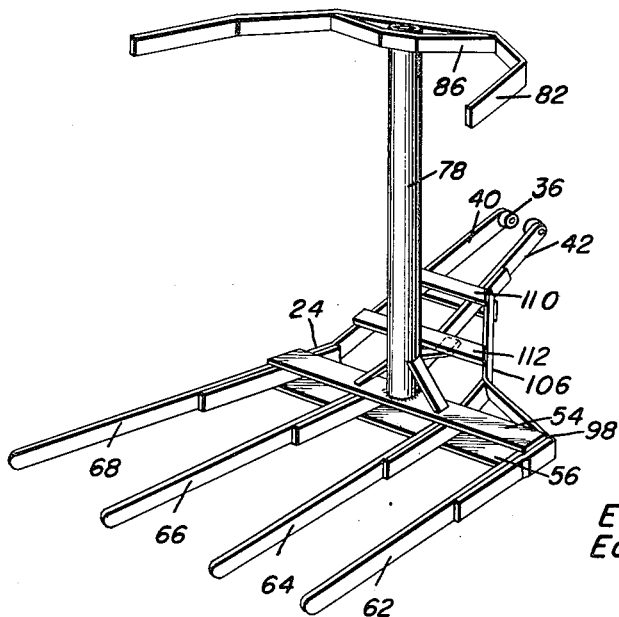
Elwyn M. Garner
Edward T. Turner
INVENTORS.

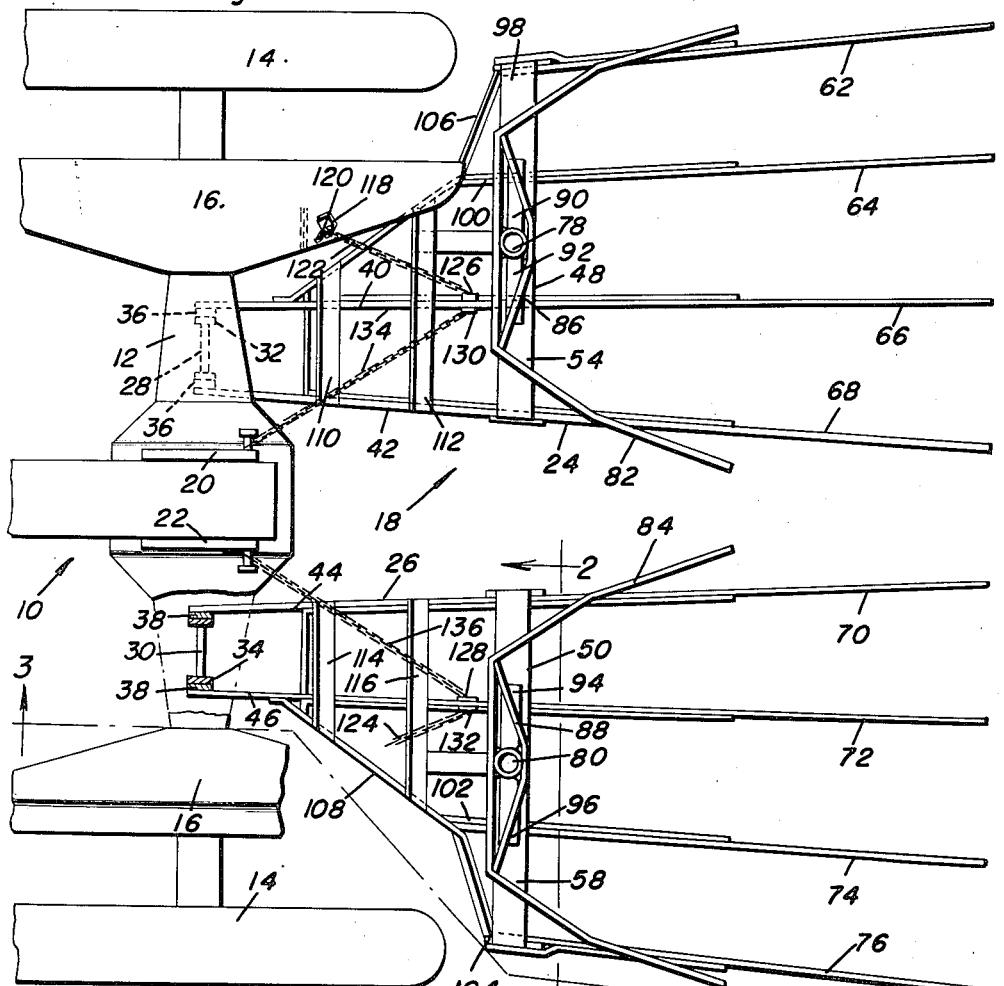

18,760,660
Patented Aug. 28, 1956

2,760,660

PEANUT STACK CARRIER

Elwyn M. Garner and Edward T. Turner,
Roanoke Rapids, N. C.

Application April 27, 1954, Serial No. 425,784

2 Claims. (Cl. 214—131)

This invention relates to the class of agricultural equipment and more particularly to a novel peanut stack carrier adapted for use in combination with a tractor.

The primary object of this invention resides in the provision of a peanut stack carrier adapted to lift and convey peanut stacks in a convenient and secure manner, the peanut stack carrier being adapted to be attached to a tractor vehicle of any conventional model or manufacture and being operable by the hydraulic operating system of the tractor to lift and convey two stacks of peanuts.

This peanut stack carrier employs a pair of lifts which are pivotally mounted on an axle of the vehicle. Each of the lifts are provided with forks as well as a peanut stack embracing and holding arm which is vertically spaced from the fork. A set of lift chains are attached to the operating arms which are hydraulically operated mounted on the vehicle and to the lifts. A further set of chains are terminally attached to the tractor and to the lifts and have bight portions adapted to engage brackets mounted on the vehicle so as to lockingly hold the lifts in an elevated position if such is desired even though the hydraulically operated means have been actuated to permit the operating arms to attain a lowered position.

Still further objects and features of this invention reside in the provision of a two stack peanut carrier that is strong and durable, capable of being attached to any of the various makes and models of existing farm tractors and the like, which is suitably reinforced against wear, distortion or twisting, and which is capable of carrying two stacks of peanuts so as to thus reduce the amount of trips necessary to be taken by the peanut stack carrier to reduce the expensive operation of the apparatus while also reducing the possibility of damage occurring to other crops by the trowel of the peanut stack carrier.

These, together with the various ancillary objects and features of the invention which will become apparent as the following description proceeds, are attained by this peanut stack carrier, a preferred embodiment of which has been illustrated in the accompanying drawings, by way of example only, wherein:

Figure 1 is a top plan view of the peanut stack carrier comprising the present invention;

Figure 2 is a vertical sectional view as taken along the plane of line 2—2 in Figure 1;

Figure 3 is a side elevational view of the peanut stack carrier with part of a tractor vehicle on which the peanut stack carrier is used in combination being shown in section as taken along the plane of line 3—3 in Figure 1; and Figure 4 is a perspective view of one of the lifts incorporated in the peanut stack carrier.

With continuing reference to the accompanying drawings wherein like reference numerals designate similar parts throughout the various views, reference numeral 10 generally designates a tractor vehicle of any conventional construction having an axle 12 on which wheels 14 are mounted, the tractor 10 being preferably provided with fenders 16. It is to be recognized that the peanut stack carrier which is generally designated by reference numeral 18 may be mounted on the front or rear of a tractor vehicle and is adapted to be used in conjunction with the hydraulic system of the tractor 10 includes a pair of simultaneously operable hydraulic lift arms 20 and 22.

The peanut stack carrier 18 includes a pair of lifts 24 and 26 which are of similar construction and which are mounted on the right and left portions respectively of the axle 12 by means of bolts, pins, or the like 28 and 30 which extend through ears 32 and 34 depending from the axle 12, the bolts or pins 28 and 30 extending through bushings 36 and 38 attached to the pair of supporting arms 40, 42 and 44, 46 of the lifts 24 and 26, respectively.

The lifts 24 and 26 includes forks 48 and 50 which include upper and lower spaced plates 54, 56, and 58, 60. Welded to the spaced plates 54, 56 and 58, 60 are sets of tines 62, 64, 66, 68 and 70, 72, 74 and 76 which may be suitably reinforced by strengthening members as necessary.

Vertically upwardly extending from the plates 54 and 58 are standards 78 and 80 which carry at their upper portions thereof vertically spaced from the tines substantially U-shaped peanut stack embracing and holding arms 82 and 84 which are preferably welded to the standards 78 and 80 and reinforced by braces 86 and 88 which are terminally welded to the U-shaped embracing and holding arms 82 and 84 while further being welded to the standards 78 and 80. Other brace means as indicated at 90, 92 and 94, 96 are utilized to rigidify the connection between the standards 78 and 80 and the plates 54 and 58.

It is to be noted that the supporting arms 40, 42 and 44, 46 form extensions of the tines 66, 68 and 70, 72 though the supporting arms extend angularly downwardly from the axle 12. Brace arms as are indicated at 98, 100 and 102, 104 terminate short of the supporting arms 40, 42 and 44, 46 and are interconnected with each other and with the support arms 40 and 46 by means of braces such as those indicated by reference numerals 106 and 108. It is to be noted that the brace arms 98, 100, 102 and 104 may be of any satisfactory length as to maintain the proper clearance of the lifts 24 and 26 from the other portions of the tractor 10.

Cross braces as at 110, 112 and 114, 116 further rigidify the structure.

Welded, bolted, or otherwise attached to the fenders 16 of the vehicle or other suitable portions of the tractor 10 are angle shaped holding and locking brackets 118 provided with notches 120 therein for reception of the bights or middle portions of locking chains 122 and 124. The chains 122 and 124 are terminally attached to the fenders or other structural portions of the tractor 10 as well as to the lifts 24 and 26 as at 126 and 128. Further secured to the lifts 24 and 26 as at 130 and 132 are lift chains 134 and 136 which are also attached to the lift arms 20 and 22.

The operation of this device is quite simple. With the lifts 24 and 26 in a lowered position the tractor may be moved so as to position the sets of tines of one of the lifts beneath the stack of peanuts to be raised. Then, utilizing the hydraulic means for actuating simultaneously the arms 20 and 22 the peanut stack may be raised. With the stack in the raised position, the locking chains 122 may have its bight portion engaged in the notch 120 and the holding bracket 118 thereof and even though the arms 20 and 22 are simultaneously lowered the peanut stack is maintained in a raised position so that the entire operation can again be undertaken for the other lift.

In order to lower the stacks the reverse operation is utilized.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A two stack peanut carrier for use in combination with a tractor vehicle comprising a pair of lifts, means pivotally attaching said lifts to said tractor vehicle, a pair of simultaneously operable hydraulically actuated operating arms on said tractor vehicle, a pair of brackets attached to said tractor vehicle, a pair of lift chains terminally attached to said operating arms and said lifts, a pair of locking chains terminally attached to said tractor vehicle and said lifts, said brackets being lockingly engageable by the bights of said locking chains, each of said lifts including supporting arms rotatably mounted on said tractor vehicle, a fork attached to said supporting arms, a standard rising from said fork, and a peanut stack embracing and holding arms secured to said standard spaced from said fork, said fork including a pair of vertically spaced plates, spaced tines secured to said plates, said peanut stack embracing and holding arms extending outwardly of said tines above said tines whereby a peanut stack carried by said tines will be embraced by said peanut stack embracing and holding arms, said supporting arms being secured to said plates and forming extensions of some of said tines, brace arms secured to said plates and forming extensions of other of said tines, and braces interconnecting said brace arms and said supporting arms.

2. A two stack peanut carrier for use in combination with a tractor vehicle comprising a pair of lifts, means pivotally attaching said lifts to said tractor vehicle, a pair of simultaneously operable hydraulically actuated operating arms on said tractor vehicle, a pair of brackets attached to said tractor vehicle, a pair of lift chains terminally attached to said operating arms and said lifts, a pair of locking chains terminally attached to said tractor vehicle and said lifts, said brackets being lockingly engageable by the bights of said locking chains, each of said lifts including supporting arms rotatably mounted on said tractor vehicle, a fork attached to said supporting arms, a standard rising from said fork, and a peanut stack embracing and holding arms secured to said standard spaced from said fork, said peanut stack embracing and holding arm being substantially U-shaped, said fork including a pair of vertically spaced plates, spaced tines secured to said plates, said peanut stack embracing and holding arms extending outwardly of said tines above said tines whereby a peanut stack carried by said tines will be embraced by said peanut stack embracing and holding arms, said supporting arms being secured to said plates and forming extensions of some of said tines, brace arms secured to said plates and forming extensions of other of said tines, and braces interconnecting said brace arms and said supporting arms.

References Cited in the file of this patent

UNITED STATES PATENTS

| | | |
|---|---|---|
| 2,383,182 | Evans et al. | Aug. 21, 1945 |
| 2,383,386 | Hipple | Aug. 21, 1945 |
| 2,471,152 | Griffin | May 24, 1949 |